July 19, 1949. H. L. SPENCER 2,476,435
AIR CONDITIONED VEHICLE
Filed Aug. 19, 1944

HARLAN L. SPENCER.
INVENTOR.
BY Oltsch & Knoblock
Attorneys.

Patented July 19, 1949

2,476,435

UNITED STATES PATENT OFFICE 2,476,435

AIR-CONDITIONED VEHICLE

Harlan L. Spencer, Syracuse, Ind.

Application August 19, 1944, Serial No. 550,139

6 Claims. (Cl. 98—10)

This invention relates to an air conditioned vehicle but more particularly the invention relates to trailers constructed to provide living quarters, namely, so-called "house trailers" or "trailer coaches".

The primary object of the invention is to provide a vehicle construction of such nature as to permit effective and comfortable heating and circulation of air therein without danger of the formation of frost therein which commonly results from "sweating" or condensation in cold weather.

A further object is to provide a vehicle which can be cooled effectively during hot weather.

A further object is to provide a novel insulated vehicle floor construction.

A further object is to provide a novel vehicle ceiling construction.

A further object is to provide a novel vehicle construction for circulating air therethrough in various controlled paths or flows for heating and cooling purposes.

A further object is to provide a vehicle having different compartments or rooms therein and novel means for controlling the circulation of air to and from and within said compartments for heating or cooling the same.

Other objects will be apparent from the description, drawing and appended claims.

Figure 1:
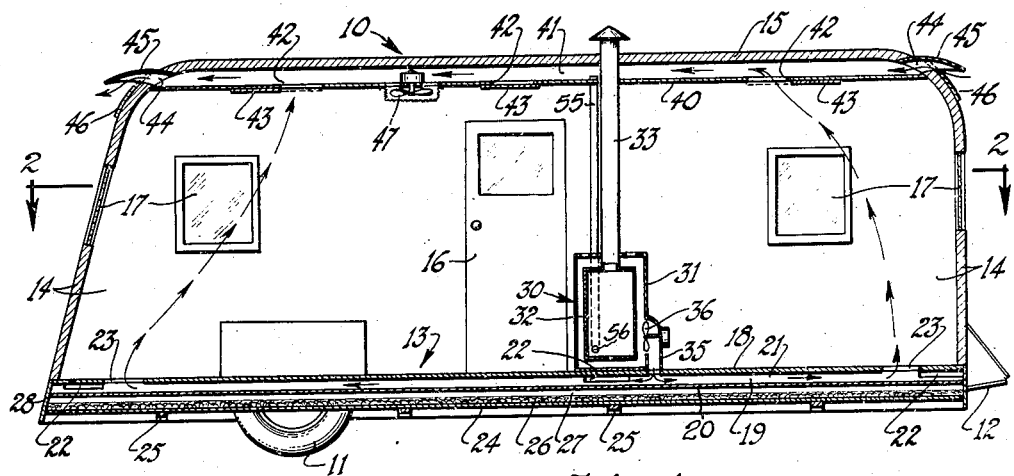
Fig. 1 is a longitudinal vertical sectional view of a trailer, taken on line 1—1 of Fig. 2.

Referring to the drawing which illustrates the preferred embodiment of the invention, the numeral 10 designates the body of a house trailer, illustrated as devoid of fittings and furnishings. The trailer is mounted on wheels 11 and has a suitable hitch member 12 for connection with a towing vehicle. The trailer body has a floor designated generally at 13, side and end walls 14, and a roof 15. The walls 14 and roof 15 are formed of wood, plywood, metal or any other suitable material, and are preferably insulated in any suitable manner. Door 16 and windows 17 are provided in walls 14 in the manner well understood in the art.

Figure 3:
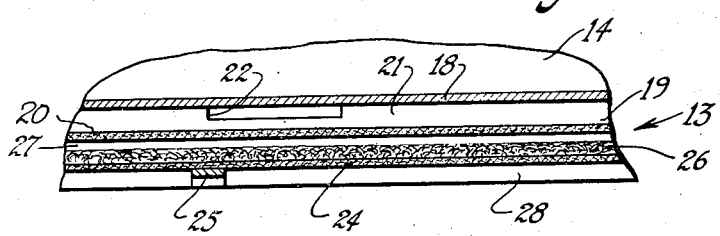
Fig. 3 is an enlarged fragmentary detail sectional view of the floor construction.

The construction of the floor is best illustrated in Fig. 3, and is disclosed and claimed in my copending application Serial No. 63,315, filed December 3, 1948, and which contains claims and matter divided out from this application as well as additional matter. An upper floor panel 18 is suitably supported by longitudinal frame members 19. An intermediate panel 20 is supported at the bottom edges of frame members 19, said panel preferably being formed of rigid composition or insulation board such as "Celotex" secured to said frame members. This construction provides a plurality of closed longitudinal passages or ducts 21. Frame members 19 are preferably notched at 22 at spaced points to provide communication between ducts 21. Registers or grilled openings 23 are provided in the upper floor panel 18 at opposite ends thereof for communication with selected ducts 21. In spaced relation below panel 20 is mounted a bottom panel 24, preferably formed of rigid insulation or composition board which is suitably waterproofed, but which may be formed of any other suitable material, such as wood or metal. Transverse supports 25 may be provided to support and position said bottom panel 24. Upon the bottom panel 24 is supported a layer of insulation material 26, such as blanket type, batt type or loose insulation material. Insulation layer 26 is preferably of a thickness slightly less than the spacing between bottom panel 24 and intermediate panel 20, whereby an air space 27 is provided between intermediate panel 20 and layer 26. The lower portions 28 of the side and end walls 14 of the vehicle preferably extend to or below the level of bottom panel 24, to seal the air space 27 and make it an effective insulating dead air space.

A space heater 30 is installed in the trailer, preferably near the center thereof. Heater 30 may be of any suitable type and construction, and is here illustrated as comprising an outer housing 31, a combustion chamber 32 within said housing, and a stack 33 projecting from chamber 32 to and through the vehicle roof. The top of housing 31 is preferably apertured or grilled at 34 for passage of air therethrough, and a duct 35 communicates with housing 31 and extends through floor panel 18 for communication with one of the sub-floor ducts 21. A fan 36 is mounted in duct 35 to facilitate air flow to and from the heater.

A ceiling panel 40, which may be formed of insulation board, is mounted in spaced relation below the roof to provide a shallow unobstructed air space 41 between the roof and ceiling. The ceiling has a plurality of spaced openings 42 formed therein, and closure panels 43 are slidably mounted on the ceiling to selectively close said openings fully or partially or to leave the same open fully. At the front and rear ends of the roof 15, as at the curved marginal portion thereof which merges with the front and back walls 14, are provided openings 44 which communicate with the air space 41. Suitable hoods 45 are mounted at the openings 44 and project outwardly from the vehicle a distance sufficient to prevent entry of rain and snow through openings 44. Sliding closure panels 46 may be mounted exteriorly of the vehicle to selectively open or close the openings 44. If desired, a suction fan 47 may be mounted in the ceiling 40 at any suitable or convenient location.

Figure 2:
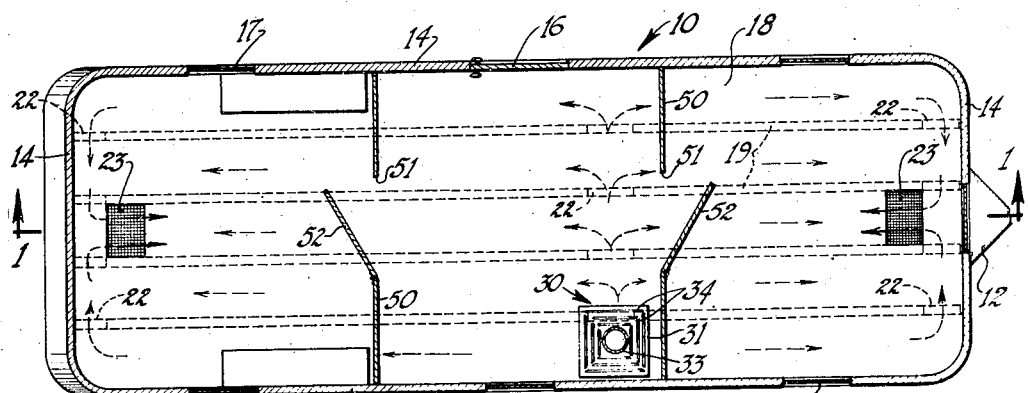
Fig. 2 is a longitudinal horizontal sectional view of the trailer, taken on line 2—2 of Fig. 1.

Fig. 2 illustrates a trailer which is provided with transverse vertical walls or partitions 50 dividing it into rooms. Walls 50 have door openings 51 and doors 52 for closing said door openings. In such constructions, the heater 30 will preferably be located in the central room or compartment, and a register 23 will be located in each end room or compartment. Also, one ceiling opening 42 will be provided in communication with each of the rooms or compartments.

The construction and arrangement of the various parts of the trailer body accommodates effective and comfortable heating in cold weather and effective cooling in hot weather.

For heating purposes the closures 46 will shut off the openings 44 and the closures 43 will close the openings 42. Thus the space 41 between the roof and ceiling becomes a sealed dead air space providing, with the insulation materials incorporated in these body parts, an effective insulation adapted to retain heat within the trailer. The floor construction is likewise effectively insulated by the combined effects of the insulating materials 20, 24 and 26 and of the dead air space 27. When the heater 30 operates, assuming the above described adjustments, heated air will circulate effectively throughout the trailer to heat it substantially uniformly throughout. The fan 36 forces the circulation of air, for example, in the direction of the arrows, i. e., down into and through the ducts 21 whose communication at notches 22 permits uniform heating of the entire upper floor panel 18. The air is discharged from the ducts at the registers 23 and circulates through the trailer for return and reheating in heater 30. This heats the floor, the air and the walls of the trailer to avoid frosting within the trailer. The direction of air flow is strictly illustrative, and may be reversed if desired. Likewise, means may be provided to controllably introduce small amounts of fresh air, as at a point below and adjacent the heater.

Where a multi-compartment trailer as illustrated in Fig. 2 is to be heated, an air flow or circulation similar to that described above will be effective as long as the doors 52 between the compartments are open. Heating efficiency need not be reduced measurably if these doors are closed, however. This result can be obtained by opening the ceiling vents 42—43, while keeping vents 44—45 closed, or opened only to an extent to admit small quantities of fresh air for proper ventilation. Air circulation in such cases is from the heater, through the under-floor passages to the registers, into and upwardly through the end compartments to passages 42, through the space 41 to the passage 42 in the central compartment, and thence through the latter compartment to the heater; or in a flow reverse of that described above. This circulation is effective for heating, and also for preventing distribution of cooking odors, etc., throughout the entire trailer. In this multiple compartment construction, it may be desirable to provide the roof 15 with better insulation properties than in other constructions to compensate for the loss of the insulation effect of the air space 41 in cases where the latter is sealed instead of forming a part of the air circulating path or circuit.

When it is desired to ventilate or cool the vehicle, particularly in hot weather, the closures 46 at the ends of space 41 and one or more of ceiling closures 43 are both opened. If the vehicle is moving, a flow of air through space 41 will occur, and will cool the upper part of the vehicle. Also, such a flow of air in space 41 will have an aspirating effect, tending to draw air from the upper portion of the trailer or of the individual chambers or compartments thereof. When the trailer is stationary, the same cooling and ventilating effect can be obtained in several ways. For example, if a suction fan 47 is provided, it may be operated to withdraw air from the trailer into the space 41. Alternatively, fan 36 may be operated to obtain a uniform circulation of air throughout the trailer by drawing air from the upper part of the trailer into and through the heater housing 31 and the sub-floor ducts 21, and thence discharging the air at the registers into and through the trailer chamber or compartments and thence into the ceiling space 41 through the openings 42. The latter cooling circulation is effective to cool and ventilate all chambers of a multiple compartment trailer when the connecting doors 52 are closed, and to prevent diffusion of cooking and other odors throughout the trailer.

It will be apparent from the above description of the trailer that it provides an all-purpose air conditioning arrangement; that the trailer provides comfortable living conditions in all weather; and that the arrangement of parts provides utmost utility and particularly a flexibility or variation of different air flow circuits or paths which makes possible maintenance of comfortable air conditions within the trailer under any weather condition whether the trailer is stationary or moving.

Another feature of the invention made possible by the body construction of the trailer is shown in Fig. 1. This involves the provision of an air intake conduit 55 connected at its lower end with the combustion chamber 32 of the heater at 56 and extending upwardly and through the ceiling to terminate within space 41. Air to support combustion is supplied through this conduit. The advantage of this construction is that the floor construction can be made continuous, with resultant improved insulation properties, since it is not necessary to provide the customary opening therethrough to supply air to support combustion in the heater.

I claim:

1. In a vehicle of the character described having a roof and floor structures and side and end wall structures joining the roof and floor to enclose a living compartment space and in which each of the floor and roof structures includes spaced panels providing air spaces therebetween over substantial areas of each, each of said roof and floor structures having a plurality of openings providing communication between the air spaces of each of the roof and floor structures and the said living compartment space, the places of the openings in each structure being spaced a substantial distance from one another, air passage means for selectively connecting one of said air spaces with the atmosphere exterior of the vehicle, and means for selectively effecting a forced flow of air in a cycle including said air spaces of the roof and floor and said living compartment space or in a cycle including said floor air space and said living compartment space.

2. In a vehicle of the character described having a roof and floor structures and side and end wall structures joining the roof and floor to enclose a living compartment space and in which each of the roof and floor structures includes spaced panels providing air spaces therebetween over areas of each, said areas being respectively substantially coextensive with the areas of the roof and floor, each of said roof and floor structures having openings providing communication between the air spaces of each of the roof and floor structures and the said living compartment space, the openings in each structure being located in spaced relation to one another and including at least one opening adjacent to each end area of said living compartment space, air passage means for selectively connecting one of said air spaces with the atmosphere exterior of the vehicle, means for selectively effecting a forced flow of air in a cycle including the air space of either of said structures and the said living compartment space or in a cycle including the air spaces of both of said structures and said living compartment space, and selectively operable heater means for heating air circulated in either of said cycles.

3. In a vehicle body of the character described including a floor, side and end walls and a roof defining living compartment space therebetween, and in which a substantial area of each of the floor and roof is composed of a pair of spaced panels, each pair defining an air space therebetween, the inner panel of each pair having a plurality of spaced air passage openings connecting the air space between the panels with living compartment space, said air passage openings including at least one adjacent to each end portion of said compartment space, one end of the vehicle body having an air passage from the exterior thereof to the space between the roof panels, selectively operable means for opening and closing said air passage opening between the roof panel air space and said compartment space and between the roof panel air space and the body exterior, and means for creating a forced flow of air in a substantially closed cycle through said floor panel air space, the openings in the inner floor panel adjacent to the ends of the said compartment space and through said compartment space when said passages connecting the roof panel space and compartment space are closed, and for creating a forced flow of air through said floor panel air space, at least a portion of said roof panel air space and said compartment space, when at least two of said roof panel passages to the living compartment space are open.

4. In a vehicle of the character described including roof and floor structures and side and end wall structures joining the roof and floor to enclose a living compartment space and including transversely extending partition means dividing the said living space into a plurality of relatively separate rooms in which each of the roof and floor structures includes spaced panels providing air spaces therebetween over areas of each, said areas being respectively substantially equal to the areas of the roof and floor, there being an opening from the air space of each of said roof and floor structures to each of the said rooms of the said living space, means for selectively effecting a forced flow of air in a cycle including the air space of either of said structures and each of the said rooms of said living space or in a cycle including the air spaces of both of said structures and said living space, and selectively operable heater means for heating air circulated in either of said cycles.

5. In a vehicle of the character described having a roof and floor structures and side and end wall structures joining the roof and floor to enclose a living compartment space, and transversely extending partition means intermediate of the living compartment space thereby to provide relatively separate rooms, each of the floor and roof structures including spaced panels providing air spaces therebetween over substantial areas of each, each of said roof and floor structures having a plurality of openings providing communication between the air spaces of each of the roof and floor structures and each of said separate rooms of the said living space, air passage means for selectively connecting one of said air spaces with the atmosphere exterior of the vehicle, and means for selectively effecting a forced flow of air in a cycle including said air spaces of the roof and floor and either room of said living space or in a cycle including said floor air space and each room of the said living space.

6. In a vehicle body of the character described including a floor, side and end walls, a roof and transversely extending and spaced partitions between the side walls and intermediate of the end walls, said walls, roof, floor and partitions defining at least three relatively separate rooms providing living quarters, including end rooms and an intermediate room, a substantial area of each of the floor and roof being composed of spaced panels defining an air space therebetween, the inner panel of each of such spaced panels having air openings connecting the air space between the panels with each room of the living quarters, one end of the vehicle body having an air passage opening from the exterior thereof to the space between the roof panels, selectively operable means for opening and closing said air passage openings between the roof panel air space and the body exterior and between the roof panel air space and each of said rooms, and means for creating a forced flow of air in a substantially closed cycle through said floor panel air space, the openings in the inner floor panel to the end rooms and thence to the intermediate room of the living quarters through portions of the roof panel air space when said roof panel air passages to the several rooms of the living quarters space are open.

HARLAN L. SPENCER.

(References on following page)

REFERENCES CITED

The following references are of record in the file of this patent:

UNITED STATES PATENTS

| Number | Name | Date |
|---|---|---|
| 523,512 | Canada | July 24, 1894 |
| 836,934 | Layng | Nov. 27, 1906 |
| 1,013,517 | Robbins et al. | Jan. 2, 1912 |
| 1,328,820 | Clark | Jan. 27, 1920 |
| 1,388,600 | Posson | Aug. 23, 1921 |
| 1,594,894 | Masury | Aug. 3, 1926 |
| 1,618,152 | Hutchins | Feb. 15, 1927 |
| 1,758,573 | Lucke | May 13, 1930 |
| 1,778,546 | Bode | Oct. 14, 1930 |
| 1,778,591 | Genett | Oct. 14, 1930 |
| 1,918,630 | Bombard et al. | July 18, 1933 |
| 1,975,958 | Kyle | Oct. 9, 1934 |
| 1,998,808 | Gates | Apr. 23, 1935 |
| 2,012,594 | Walker | Aug. 27, 1935 |
| 2,087,651 | Mygland | July 20, 1937 |
| 2,103,990 | Mayer | Dec. 28, 1937 |
| 2,151,097 | Germonprez | Mar. 21, 1939 |
| 2,171,622 | Calkins | Sept. 5, 1939 |
| 2,195,691 | Burt | Apr. 2, 1940 |
| 2,203,814 | Clements | June 11, 1940 |
| 2,225,244 | Anderson | Dec. 17, 1940 |
| 2,326,318 | Anderson | Aug. 10, 1943 |

FOREIGN PATENTS

| Number | Country | Date |
|---|---|---|
| 342,217 | Germany | Oct. 14, 1921 |